United States Patent [19]

Tsuzuki et al.

[11] Patent Number: 4,572,635
[45] Date of Patent: Feb. 25, 1986

[54] AUTOMATIC FILM LOADING SYSTEM

[75] Inventors: Yu Tsuzuki, Hirakata; Hiroshi Watanabe, Suita; Katsuhisa Niwa, Osaka, all of Japan

[73] Assignee: West Electric Company, Ltd., Osaka, Japan

[21] Appl. No.: 617,477

[22] Filed: Jun. 5, 1984

[30] Foreign Application Priority Data

Jun. 6, 1983 [JP] Japan .................. 58-101142

[51] Int. Cl.$^4$ .............................. G03B 1/12
[52] U.S. Cl. .................. 354/173.1; 354/212
[58] Field of Search ............. 354/173.1, 212–214; 242/71.4, 71.5

[56] References Cited

U.S. PATENT DOCUMENTS 4,416,525 11/1983 Chan .................. 354/173.1

Primary Examiner—John Gonzales
Attorney, Agent, or Firm—Cushman, Darby & Cushman

[57] ABSTRACT

In an automatic film loading system, a film winding spool (9) is driven at a higher speed by a motor (20) through gears (120, 12, 122, 13), and the film advancing sprocket (4) is driven by a speed to drive the film at a slower speed before catching of the film by a rubber member of the spool, and after the catching, a clutch (121) disconnects the driving of the sprocket (4) from the gears (120, 12).

4 Claims, 3 Drawing Figures

AUTOMATIC FILM LOADING SYSTEM

BACKGROUND OF THE INVENTION

1. Field of the Invention

The present invention relates to an automatic film loading system of a camera using a film with perforation, such as 35 mm film.

2. Description of the Prior Art

Many kinds of an automatic film loading system have been proposed and used for a 35 mm camera.

Supplying method of the driving power to the film can be classified into two classes. The one is that both the sprocket gear and spool drive the film, and the other is that the spool only drives the film.

In the former system, the sprocket gear hooks the perforations of the film and forward it to wind the spool. The spool has a friction clutch inside thereof, it has been designed such that the rotating speed of the spool is higher than that of the sprocket. Therefore, the difference of the rotating speed between the spool and the sprocket causes slip inside the spool during winding up of the film. In this kind of system, after the film have been caught by the spool, the film is wound up by the rotating force of the spool only. For this reason, in the prior system using the friction clutch, when the torque of the friction clutch is larger than a designed value, required total winding energy is excessively large in comparison with the normal state. Therefore the load of the driving motor is large as a result. It is the problem that the electric consumption increases in comparison with the normal designed operation. Furthermore, as the rotating speed of the spool is fast, sometimes the perforation of the film pass over the teeth of sprocket, and the scratch noise rises. At the worst, the perforations break. On the other hand, in the case where the torque of said friction clutch inside of the spool is excessively low, the film driven by the sprocket is not wound around the spool rightly. As a result, the film is not wound up. The control of the setting of the friction clutch's torque is very difficult on the manufacture in mass production basis, because the natures of the films are different by manufacturers, and the condition of the battery (for instance, voltage) varies.

Furthermore, there is a liability the force to drive the film by the sprocket gear becomes greater than that of the spool. In that case, when the film winding is stopped, if the driving by the spool of the film does not stop instantly, the perforation of the film will break. To prevent such accident, almost of the above-mentioned film loading system provides a friction clutch between the driving motor and the gear train to the sprocket. However, it has the difficulty or troublesome problem to control setting up of the torque of the friction clutch on the manufacturing process, similarly to the above-mentioned friction clutch inside of the spool.

On the other hand, the film loading system which wind up the film by the spool only has one or several hooks on the spool, the film is wound up by being hooked of its perforations to the hook. In this case, therefore, the friction clutch is unnecessary and there is no liability of trouble affected by the friction clutch. In this system, however, the tip of the film must be drawn from a patrone with an accurate length by a user. This is a troublesome matter. For instance, if the film have been drawn longer than the proper length from the patrone, the tip of the film undesirably touches the wall of the spool room, and the film is liable to get out of the hook of the spool, as to the winding system of the spool having one hook therearound. Concerning the winding system of the spool having several hooks there-around, the film is likely to become sagged between several hooks around of the spool. Of course the film is wound around the spool in piles of many layers. Accordingly, care must be taken on positional rotation between the hooks and the layers of wound film. Since drawing out with necessary accurate length of film from the patrone is a difficult matter for layman user, the second type automatic winding system with the spool having the hooks is not always stable in operation. In addition, when plural layers of the wound film pushes a hook which is of a type fixed on the spool, there are apprehension of unstable engagement of the film on the spool. Accordingly, the hook should preferably configurated movable into the spool boss when pressed by the film. Such mechanism, however, is too complex to be mass-produced.

SUMMARY OF THE INVENTION

It is an object of the invention to provide an improved automatic film loading system capable of stable loading of the film without a friction clutch, which is liable to have operation trouble, or the hooks on a spool.

The automatic film loading system in accordance with the present invention comprises:

motor means for feeding driving power for winding up a film, a film spool having catching means for catching a starting end tip of the film, a sprocket having sprocket gears each with dents for engaging perforation of the film, first transmission means comprising gear means energized by the motor, for transmitting revolution corresponding to a higher film advancing speed, to the film spool, second transmission means comprising gear means energized by the motor, for transmitting a second revolution corresponding to a lower film advancing speed, to the sprocket, and transmission control means for controlling transmission/non-transmission of the second revolution to the sprocket when film advancing speed rises from a lower speed given by the sprocket to a higher speed given by the spool after reaching a film advancing speed given by the spool by catching of the film by the catching means.

DETAILED DESCRIPTION OF A PREFERRED EMBODIMENT

Figure 1:
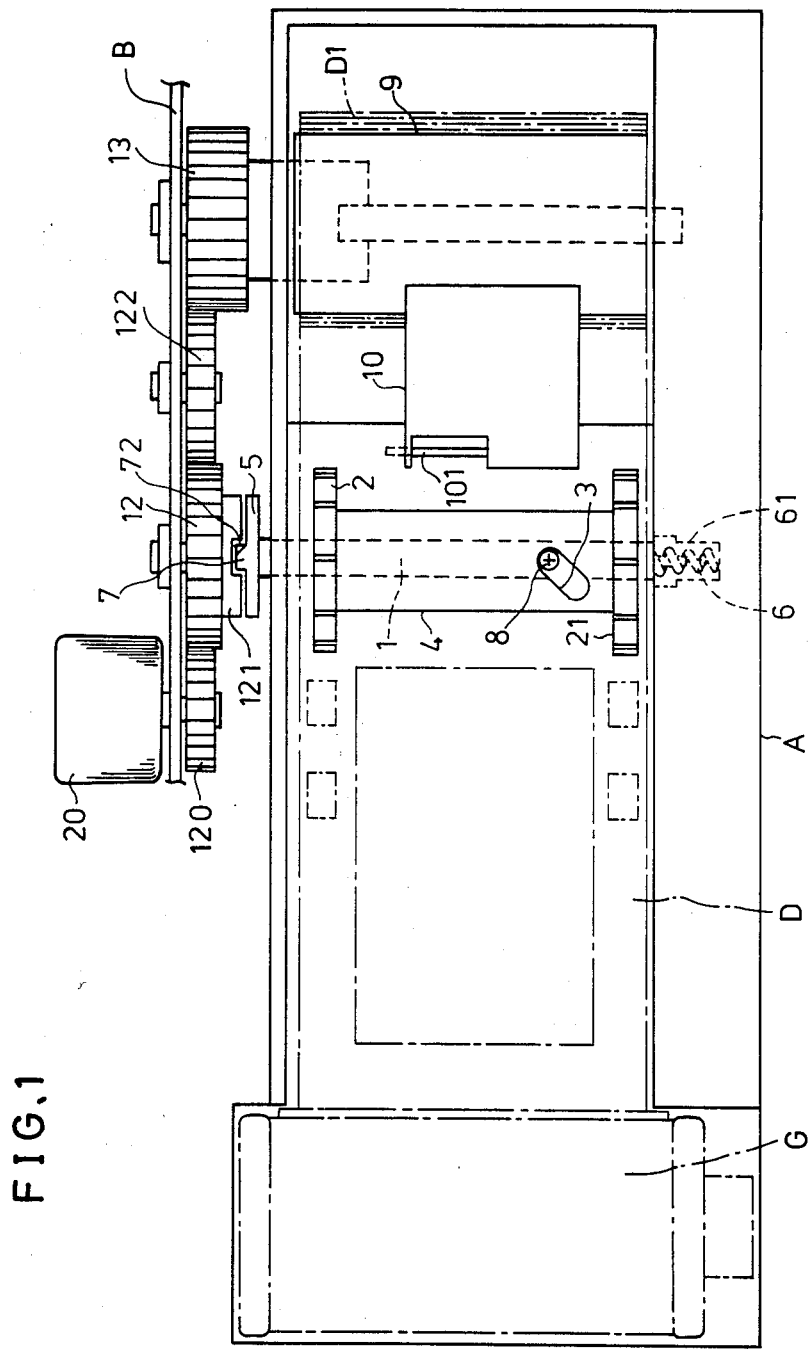
FIG. 1 is an elevational view of a main part of an automatic film loading system embodying the present invention.
Figure 2:
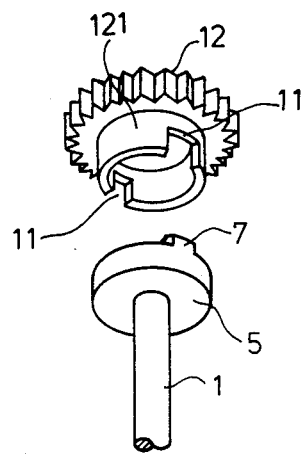
FIG. 2 is a perspective view of a clutch of a sprocket shaft.
Figure 3:
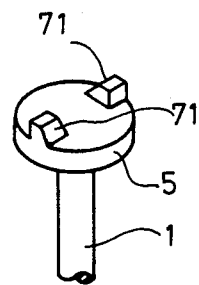
FIG. 3 is a perspective view of a flange with two projection of a modified type clutch.

FIG. 1 is a perspective view of a main part of a camera embodying the present invention.

A sprocket shaft 1 has a flange 5 with two projection 7 on the upper end, and a pin 8 at the side thereof. A sprocket 4 provides two gears 2, 21 on both ends. An oblique slot 3 is provided on a part of the sprocket 4 at a near the lower gear 21. The sprocket shaft 1 is inserted in the sprocket 4 and the pin 8 is inserted in the oblique slot 3. The lower end of the sprocket shaft 1 is pushed up by a spring 6 in normal state. The spring 6 is supported at the lower end in the spring case 61 shown by a dotted line. The sprocket shaft 1 is slidably held being pushed up by the spring 6 inside the sprocket 4. Driving motor 20 is fixed on the upper side of the frame B. Four gears 120, 12, 122, 13 are rotatably arranged engaging each other, beneath said frame B. The gear 120 is connected to the shaft of the motor 20. The gear 12 engages with the gear 120. A boss 121 with two indents 11, 11 is fixed concentrically to the gear 12. Said two indents 11, 11 engage with two projections 7 of the flange 5 in the normal state. The gear 122 is an idle gear. The gear 13 engages with the gear 122 and is driven through the gear 122, 12 and 120 by the motor 20. A spool 9 is connected to the gear 13. A pressure member 10 is arranged at a part between the sprocket and the spool, and fixed to an inside wall of a camera body A. The pressure member 10 has a hinge 101 at the left end thereof and is pressed to the spool 9 by mean of a spring (not shown). On the spool 9, the film is wound up in plural layers as shown by the chain lines D1.

A starting end tip of the film D drawn from a patrone G is set on the spool 9 by the user. The motor 20 drives the gear 120 by a known automatic winding start switch. Since the perforations E of the film engages the gears 2, 21, of the sprocket 4, the film is driven toward the spool. The driving force of the motor 20 is supplied to the gears 12 and 13 through the gears 120 and 122, and the gears 12 and 13 rotate in the direction to advances the film toward the spool. At the first state, the film D is not yet wound around the spool 9, therefore the film D is advanced by the sprocket gears 2, 21 only. Then the tip of the film D is caught by a film catching means, such as known rubber belt provided around the spool 9 combined with a pressure member 10. The spool 9 is rotating at a higher speed for film advancing than that by the sprocket 4. Accordingly soon the film D is wound up around the spool 9 tightly, and therefore, the film D is driven at the same speed as that of the spool 9. As a result, the sprocket 4 which is engaged with the film D is forced to rotate, by the tension of the film D, at the higher speed than the sprocket shaft 1. Therefore, the pin 8 is pushed down by the upper inclined edge of the oblique slot 3, and the sprocket shaft 1 is slide down overcoming the force of the spring 6. Thus, two projections 7, 7 on the flange 5 of the sprocket shaft 1 come off from two indents 11 of the boss 121. The above-mentioned action is carried out very smoothly, because the width of each of said indents is selected wider than the width of the projection 7, 7.

In a modified embodiment, the projections 7, 7 is shaped to have oblique face 72 at the side of the projection 7, 7 that is pushing the indents 11. As a result, the sprocket 4 is freed from the driving gear 12, and is rotated by the rotating force of the spool 9 through the film D.

On the other hand, in order to stop the film D for each photographing after the driving by the rotation of the spool 9, for instance, a known revolution sensing device (not shown) is provided on the sprocket 4. That is, the motor 20 is controlled by the above-mentioned revolution sensing device, so as to give necessary film advancing through the rotation of the spool. In the above-mentioned description, the word "catching" means that the spool 9 catches the tip of the film D by means of a kind of the rubber belt provided around the spool boss with the help of the pressure member 10.

As has been described in detail for an embodiment, in the automatic film loading system of the present invention, at the first state of the film loading, the film is driven by the sprocket, therefore there is no need to provide any catching hook on the spool, but only friction means on the spool suffice. After the film was wound around the spool, the film is not driven by the sprocket, but is advanced only by the rotation of the spool. Therefore, there is no fear to break the perforations of the film. In addition, an adjustment of the torque of the friction (e.g. by a slip clutch or the like) is not necessary, and the spring pushing up the sprocket is very simple in the function and the mechanism. Thus, the manufacturing cost is low in the manufacturing process.

What is claimed is:

1. An automatic film loading system comprising:
motor means for feeding driving power for winding up a film,
a film spool having catching means for catching a starting end tip of said film,
a sprocket having sprocket gears each with teeth for engaging perforations of the film,
first transmission means comprising gear means energized by said motor means, for transmitting rotary motion corresponding to a selected film advancing speed, to said film spool,
second transmission means comprising gear means energized by said motor means, for transmitting another rotary motion to said sprocket gears to rotate said sprocket at a speed corresponding to a film advancing speed that is lower than said selected film advancing speed, and
transmission control means comprising a transmission/non-transmission means movable from a first position wherein said sprocket is connected to said second transmission means to a second position wherein said sprocket is disconnected from said second transmission means, said control means including means operable to effect movement of said transmission/non-transmission means from said first to said second position upon said sprocket being rotated at a peripheral speed corresponding substantially to said selected film advancing speed.

2. An automatic film loading system comprising:
motor means for feeding driving power for winding up a film,
a film spool having catching means for catching a starting end tip of said film,
a sprocket having sprocket gears each with teeth for engaging perforations of the film,
first transmission means comprising gear means energized by said motor means, for transmitting rotary motion corresponding to a selected film advancing speed, to said film spool,
second transmission means comprising gear means energized by said motor means, for transmitting another rotary motion to said sprocket gears to rotate said sprocket at a speed corresponding to a film advancing speed that is lower than said selected film advancing speed, and
transmission control means for controlling transmission/non-transmission of said another rotary motion to said sprocket when the film advancing speed rises from said lower speed given by said sprocket to said selected speed given by said spool after reaching a film advancing speed given by said spool by catching of said film by said catching means, said transmission control means comprising clutch means which includes indents formed on a face of a gear of said second transmission means, projections formed on one end of a sprocket shaft, an oblique slot formed on a side face of a boss part of said sprocket, an engaging pin fixed on a side face of said sprocket shaft and slidably engaging in said oblique slot and energizing means for pushing up said sprocket shaft to attain coupling between said projections and said indents, said oblique slot having such inclination that when said sprocket is forced to rotate faster than said sprocket shaft, said engaging pin is pushed down thereby to disconnect coupling between said projections and said indents to free said sprocket shaft, hence, said sprocket from said second transmission means.

3. An automatic film loading system in accordance with claim 2, wherein said projection has an oblique face at the side to contact said indent when said sprocket is forced to rotate faster than said sprocket shaft.

4. An automatic film loading system comprising:

motor means for feeding driving power for winding up a film, a film spool having catching means for catching a starting end tip of said film, a sprocket having sprocket gears each with dents for engaging perforation of said film, first transmission means comprising gear means energized by said motor, means for transmitting revolutions corresponding to a higher film advancing speed, to said film spool, second transmission means comprising gear means energized by said motor, means for transmitting a second revolution corresponding to a lower film advancing speed, to said sprocket, and transmission control means for controlling transmission/non-transmission of said second revolution to said sprocket comprising clutch means which includes indents formed on a face of a gear of said second transmission means, projections formed on one end of a sprocket shaft, a cam means formed on a side face of a boss part of said sprocket, an engaging member fixed on a side face of said sprocket shaft and slidably engaging in said cam means and energizing means for pushing said sprocket to attain coupling between said projections and said indents, said cam means having such inclination that when said sprocket is forced to rotate faster than said sprocket shaft, said engaging member is pressed to disconnect coupling between said projection and said indents to free said sprocket shaft, hence, sprocket from said second transmission means.

* * * * *